US006669758B1

(12) United States Patent
Hart et al.

(10) Patent No.: US 6,669,758 B1
(45) Date of Patent: Dec. 30, 2003

(54) VARIABLE INLET AIR RESTRICTION FOR COMPOSITION CONTROL OF PRODUCT GAS

(75) Inventors: Russell F. Hart, Blue Grass, IA (US); Charles B. Hager, Davenport, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 0 days.

(21) Appl. No.: 10/064,268

(22) Filed: Jun. 27, 2002

(51) Int. Cl.[7] ............................................. B01D 53/047
(52) U.S. Cl. ...................... 95/8; 95/13; 95/96; 96/111; 96/116; 96/130; 96/399
(58) Field of Search ........................... 95/8, 12, 13, 96, 95/148; 96/111, 116, 121, 130, 399; 251/213; 137/493

(56) References Cited

U.S. PATENT DOCUMENTS

| | | | |
|---|---|---|---|
| 3,703,068 A | 11/1972 | Wagner | 95/11 |
| 3,922,149 A | 11/1975 | Ruder et al. | 95/96 |
| 4,197,095 A | 4/1980 | White, Jr. et al. | 96/130 |
| 4,349,357 A | 9/1982 | Russell | 95/130 |
| 4,404,005 A | 9/1983 | Hamlin et al. | 96/111 |
| 4,449,990 A | 5/1984 | Tedford, Jr. | 95/102 |
| 4,472,177 A | 9/1984 | Sircar | 95/11 |
| 4,516,424 A | 5/1985 | Rowland | 95/11 |
| 4,543,109 A | 9/1985 | Hamlin et al. | 95/98 |
| 4,561,287 A | 12/1985 | Rowland | 95/11 |
| 4,567,909 A | 2/1986 | Schebler et al. | 137/81.1 |
| 4,627,860 A | 12/1986 | Rowland | 96/111 |
| 4,631,073 A | 12/1986 | Null et al. | 95/8 |
| 4,648,888 A | 3/1987 | Rowland | 95/8 |
| 4,661,124 A | 4/1987 | Hamlin et al. | 55/21 |
| 4,681,099 A * | 7/1987 | Sato et al. | 128/204.23 |
| 4,687,013 A | 8/1987 | Stevenson | 96/111 |
| 4,693,730 A | 9/1987 | Miller et al. | 95/8 |
| 4,783,205 A | 11/1988 | Searle | 96/111 |
| 4,822,384 A | 4/1989 | Kato et al. | 96/111 |
| 4,927,434 A | 5/1990 | Cordes et al. | 95/96 |
| 5,004,485 A | 4/1991 | Hamlin et al. | 55/160 |
| 5,071,453 A | 12/1991 | Hradek et al. | 55/21 |
| 5,154,737 A | 10/1992 | Jenkins et al. | 95/11 |
| 5,258,056 A | 11/1993 | Shirley et al. | 95/97 |
| 5,340,381 A | 8/1994 | Vorih | 95/105 |
| 5,407,465 A | 4/1995 | Schaub et al. | 95/105 |
| 5,474,595 A | 12/1995 | McCombs | 95/96 |
| 5,486,226 A | 1/1996 | Ross et al. | 95/11 |
| 5,529,607 A | 6/1996 | Tan | 95/105 |
| 5,531,807 A | 7/1996 | McCombs | 95/96 |
| 5,593,478 A | 1/1997 | Hill et al. | 96/111 |
| 5,656,065 A | 8/1997 | Kalbassi et al. | 95/96 |
| 5,711,787 A | 1/1998 | Neill et al. | 95/96 |
| 5,733,359 A | 3/1998 | Doong et al. | 95/8 |
| 5,746,806 A | 5/1998 | Aylsworth et al. | 95/8 |
| 5,858,063 A | 1/1999 | Cao et al. | 95/11 |
| 5,917,135 A * | 6/1999 | Michaels et al. | 95/11 |
| 6,063,169 A * | 5/2000 | Cramer et al. | 96/112 |
| 6,077,331 A | 6/2000 | Phillips | 95/12 |
| 6,383,256 B1 | 5/2002 | Phillips | 95/12 |

FOREIGN PATENT DOCUMENTS

EP 0129304 1/1984

OTHER PUBLICATIONS

Haigh; "A New Concept in Life Support Systems, The NGL Molecular Sieve Oxygen Generator"; Aircraft Engineering, vol. 52, No. 1, Jan. 1982, pp. 8–12.

* cited by examiner

*Primary Examiner*—Frank M. Lawrence
(74) *Attorney, Agent, or Firm*—Marsteller & Associates, P.C.

(57) ABSTRACT

A controller system for a molecular sieve device controls a product gas generated by n molecular sieve beds for separating a gas from an input gas supply. A valve assembly with n states has an input receiving the input gas and n outlets. Each valve state in a first position creates an open passageway from the input of the slide valve to an outlet. Transitioning a valve from the first to a second position creates a variable amount of restriction in the flow of gas between the input and a selected outlet.

10 Claims, 5 Drawing Sheets

VARIABLE INLET AIR RESTRICTION FOR COMPOSITION CONTROL OF PRODUCT GAS

BACKGROUND OF INVENTION

The invention relates to the field of gas generators, and more particularly to a gas, such as oxygen, concentrator for a breathing apparatus.

BACKGROUND ART

The use of on-board oxygen generating systems (OBOGS) technology for supplying breathing gas for aviators has been used for nearly 20 years. During this period, many pilots have complained about suffering from prolonged exposure to high concentration of oxygen in the breathing gas. The ASCC Advisory Publication 61/59 recommends that the inspired gas shall not exceed 60 percent oxygen with cabin altitudes below 15,000 ft. The present invention provides a means of controlling an OBOGS to produce the desired concentration of oxygen.

Oxygen generation for aircraft breathing applications requires that the product gas concentration stays within predetermined altitude-dependent minimum and maximum physiological limits. Normally, the minimum oxygen content of the breathable gas is that required to provide, at all cabin altitudes, the same or greater oxygen partial pressure as at sea level. A maximum oxygen concentration is set to reduce the likelihood of partial lung collapse during low-altitude high G maneuvers. More particularly, the risk of partial lung collapse increases with the risk of total adsorption of entrapped pockets of gas in the lungs, which result from distortion of the lungs during high G maneuvers. The risk of total adsorption of the entrapped gas increases with increased oxygen concentration (i.e. reduced nitrogen concentration).

Methods are known for the generation of low-pressure oxygen-enriched air. One such method is referred to as pressure swing adsorption (PSA) and has the advantage of being able to provide oxygen-enriched air in a short period of time after the supply of a suitable feed gas (e.g. pressurized air). The pressure swing adsorption process uses pressure to control adsorption and desorption. According to this process, the nitrogen in pressurized air is adsorbed in a molecular sieve bed while the oxygen passes through the bed.

When the molecular sieve in the bed has become nearly saturated with nitrogen, the bed is vented to atmospheric pressure. This causes most of the nitrogen-adsorbed gases to be desorbed and discharged from the bed. In a two-bed system, when one bed is producing oxygen, some of the enriched product gas is flushed back through the (vented) other molecular sieve bed to further lower the partial pressure of the adsorbed gases in the vented bed and to complete the desorption process. Using two beds that are pressurized and flushed alternately provides a continuous flow of product gas and ensures sufficient pressure for the flushing operation.

The known OBOGS are generally based on the molecular sieve gas separation process discussed above. Such systems are said to be "self-regulating" since the pressure swing desorption increases with altitude, and therefore the efficiency of the process also increases to ensure sufficient oxygen concentration at high altitudes. More particularly, since each sieve bed is vented to the atmosphere (or cabin) during its regeneration phase, the bed pressure during desorption decreases with increasing altitude, thereby enhancing the desorption process.

In order to keep the oxygen concentration within maximum limits at low altitudes, processes have been developed to reduce the performance. There are five primary methods for reducing/altering PSA performance: Altering overall cycle time (disclosed in U.S. Pat. Nos. 4,661,124 and 5,004,485), altering relationship of fill to vent within a given cycle period (disclosed in U.S. Pat. Nos. 6,077,311 and 6,383,256 B1), artificially increasing product flow by bleeding product to ambient (disclosed in U.S. Pat. No. 4,567,909) or restricting/controlling fill opening, vent opening or both to manage pressure drop and flow.

Prior art OBOGS U.S. Pat. Nos. 4,661,124 and 5,004,485 (Hamlin, et al), disclose an alternating bed oxygen generating system with controlled sequential operation of charge and vent valves according to a series of selectable overall cycle times ranging between a minimum and a maximum, in a number of discrete steps. By extending the overall cycle time, efficiency of the system is reduced thereby regulating the product gas oxygen concentration to within physiological maximum limits.

In U.S. Pat. No. 4,661,124, the overall cycle time of the molecular sieve beds is controlled using a pressure transducer on the basis of cabin pressure that is indicative of the altitude at which the aircraft is operating.

In U.S. Pat. No. 5,004,485, an oxygen sensor is used to test the gas concentration and a comparator function is implemented to compare the sensed oxygen concentration with values in a look-up table of desired product gas oxygen concentrations at various altitudes. In response to implementing the comparator function the overall cycle time is controlled to provide suitable concentration levels.

Prior art systems employing overall cycle time control, such as disclosed in U.S. Pat. Nos. 4,661,124 and 5,004,485 (Hamlin et al) suffer from a disadvantage in that it is difficult to accurately control the output oxygen concentration because performance changes occur over a small range (e.g. 4.5 seconds to 5.5 seconds in some systems, whereas cycles ranging from 5.5 seconds to 8.5 seconds do not result in any performance changes).

Dynamic control of system performance to regulate product gas to within the minimum and maximum physiological limits requires reliable performance of the oxygen sensor connected to the concentrator output. U.S. Pat. No. 5,071,453 (Hradek, et al) discloses a Built-In-Test (BIT) function for implementing a system self-test for preflight and an oxygen sensor calibration check for operational level maintenance.

In U.S. Pat. Nos. 6,077,311 and 6,383,256 B1, the overall cycle time of each of the molecular sieve beds is maintained constant while that duration of the adsorption phase to the desorption regeneration phase is changed.

While the above-cited references introduce and disclose a number of noteworthy advances and technological improvements within the art, none completely fulfills the specific objectives achieved by this invention.

SUMMARY OF INVENTION

The present invention relies upon the ability of a slide valve or similar valve used in an OBOGS to remain in a third state which is neither completely open nor completely closed or control the rate/slew of the transition from state 1 to state 2. Furthermore, this third state should be able to be manipulated in order to provide a variable restriction to air flowing into the molecular sieve beds (charge) and depleted air flowing out of the molecular sieve beds (vent). Generally the restriction created by the less-than-completely-open valve results in a reduction of the separation efficiency of the molecular sieve bed and a reduction in the oxygen content of the product gas. The reduction in the product gas oxygen content is related to the amount of restriction created by the valve.

In accordance with the present invention, a molecular sieve gas concentration controller system controls and monitors a product gas generated by a known type of molecular sieve device that has at least n molecular sieve beds for separating a selected gas from an input gas supply. The molecular sieve control system includes m number of valves (where m is one or more) having at least 3 different states or positions. The valve further has an input for receiving the input gas supply and at least y(where y is two or more) outlets.

For example, a simple valve may have four ports: one inlet and three outlets. During operation the one inlet is for air supply, one outlet is for bed venting and two outlets are for flow of air into each of two beds: bed 1 and bed 2. The inlet is communicated to bed 1, bed 2 or both during operation. The vent is connected to the beds inversely to the inlet. When the inlet communicates with bed 1, the vent communicates with bed 2. When the inlet communicates with bed 2, the vent communicates with bed 1. The inlet and vent ports will not communicate due to the slide valve design. There are three states of the valve. State 1 is where bed 1 is fully open to the inlet (closed to the vent) and bed 2 is fully open to the vent (closed to the inlet). State 2 is where bed 2 is fully open to the inlet (closed to the vent) and bed 1 is fully open to the vent (closed to the inlet). State 3 is when the valve has moved partially from state 1 to state 2, causing variable amounts of restrictions in bed ports and vent port. The controller as a function of desired purity of product controls the amount of restriction.

A movement system, such as a piston or motor, controllably moves the valve from one state to another. A controller that is operably connected to the movement means varies the restriction in state 3 in a selected open passageway in the valve. The invention can be applied to sieve bed systems with valves independently controlling vent gas, input gas or outlet gas flows, but for simplicity of the patent description, dependent control of both inlet and vent gas flow is described.

Figure 8:
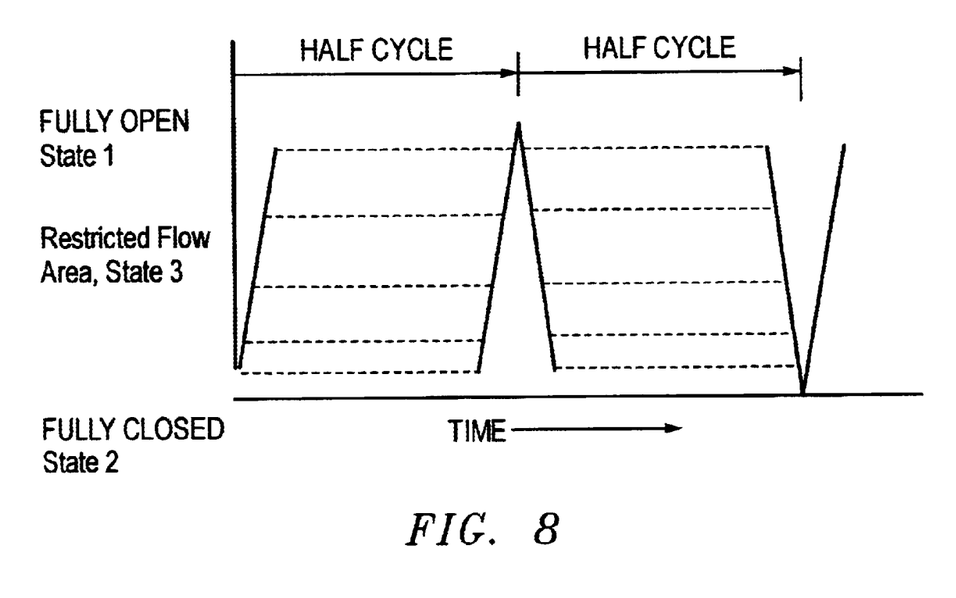
FIG. 8 is a graphical illustration of state 3 of the slide valve motion.

As the valve is caused to cycle back and forth from state 1 to state 2, it can be stopped at state 3 for any amount of time up to nearly the full half-cycle of the valve's motion in each direction. State 3 can occur in either transition from state 1 to 2, or from state 2 to 1. The diagram in FIG. 8 illustrates the state 3 of the slide valve motion (and where it is stopped) on the restriction of the flow-area of the valve. Note that the terms "fully open" and "fully closed" in this diagram refer to the inlet flow path for one bed. That is, when the slide valve is fully open to charge one bed, the vent path to that bed as well as the charge path to the other bed is fully closed. And, conversely, when the slide valve is fully closed to prevent charging one bed, the purge vent to that bed and the charge paths to the other bed are fully open.

Note that neither the frequency (or period) of the bed cycles nor the relative duration of the vent or fill to overall cycle time is changed using this method of varying product gas composition. This method provides a manner of generating a desired oxygen concentration by monitoring the oxygen concentration of the product gas and adjusting the amount of restriction created by the slide valve such that the resulting oxygen concentration is driven toward the desired value.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

One method of reducing the oxygen content of the product gas from an OBOGS is to restrict the inlets or exhaust/vent flow passages and thus creating a change of the mass flow of air into the inlet or restricting the flow through the sieve beds. This will reduce performance below optimum levels. This could be done, for instance, with an adjustable valve in the inlet airflow path or vent flow path. This is accomplished by adjusting such a valve automatically under the control of an electronic controller that monitors the oxygen content of the OBOGS product gas, a means of automatic composition control is produced.

A method of controlling the slide valve of a known system as that taught by U.S. Pat. No. 5,858,063 (Cao et al.) has been developed which simultaneously allows automatic flow restriction of the inlets and air/exhaust porting (the normal purpose for the valve). There is a variety of valves and combination of sieve bed configurations for which the present invention can be applied. In a first example the invention can be applied to a 4-port slide valve.

Figure 1:
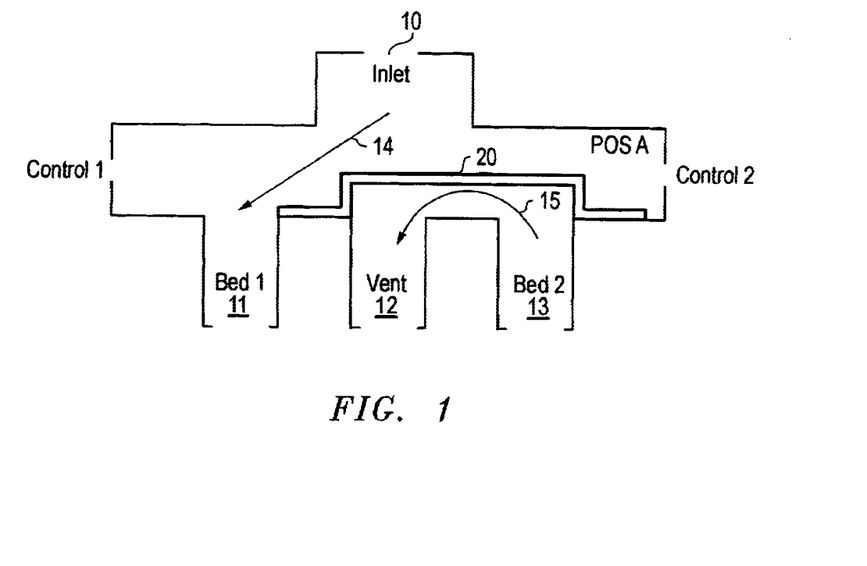
FIG. 1 is a cross section of the 4-port slide valve of the present invention, depicting state 1 for bed 1 is fully open to the inlet (closed to the vent) and state 2 for bed 2 is fully open to the vent (closed to the inlet).

A molecular sieve gas concentration controller system of the present invention controls and monitors a product gas generated by a known type of molecular sieve device that has at least n molecular sieve beds BED1, BED2 for separating a selected gas from an input gas supply INLET. The molecular sieve control system includes a slide Valve, V1 having at least n different states, where n is at least 2. The slide valve, V1 further has input 10 for receiving the input gas supply and at least n outlets 11, 12, and 13. In each state of the slide valve V1, the slide valve V1 creates an open passageway 14 permitting flow of gas from the input 10 of the slide valve to at least one different outlet 11, as shown in FIG. 1. The slide V1 has first position (POS1) that provides passageway 11, while simultaneously connecting ports 12 and 13. The passageway 15 is created simultaneously with 14.

The slide valve V1 has a first position (POS A) that has an open passageway 14 from the input 10 to a selected outlet 11, and a second position (POS B) that has or creates a blockage between the input 10 and the selected outlet 11, for example FIG. 1. Transitioning the slide valve V1 from the first to the second position is the normal operation of the valve. The slide valve V1 has a second position (POS B) that has an open passageway 16 from the input 10 to a selected outlet 13, and a first position (POS A) that has or creates a blockage between the input 10 and the selected outlet 13, for example FIG. 2. Transitioning the slide valve V1 from the second to the first position is the normal operation of the valve.

Figure 3:
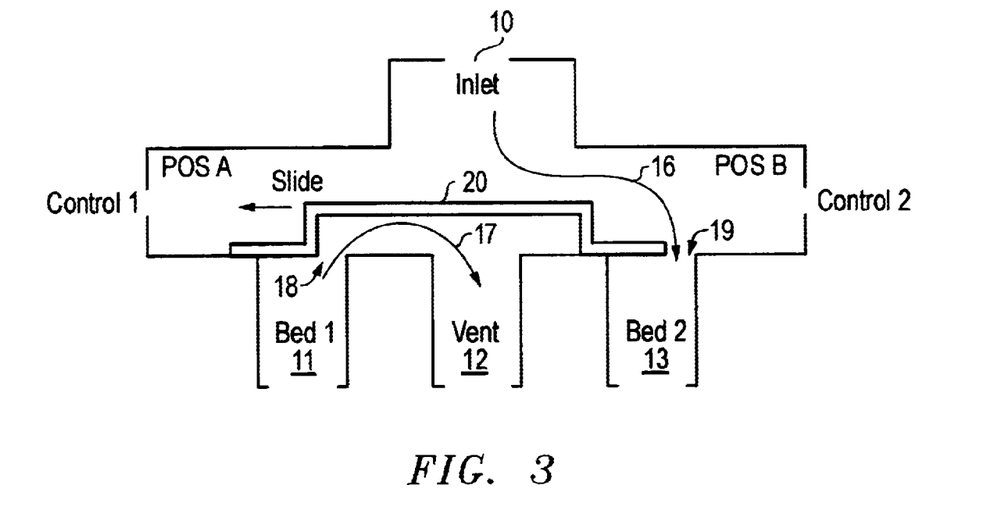
FIG. 3 is a cross section of the 4-port slide valve of the present invention, depicting state 3 where the valve has moved partially from state 1 to state 2. The state 3 is for bed 2, causing variable amounts of restrictions of flow to bed 2 and venting from bed 1 to the vent port.
Figure 4:
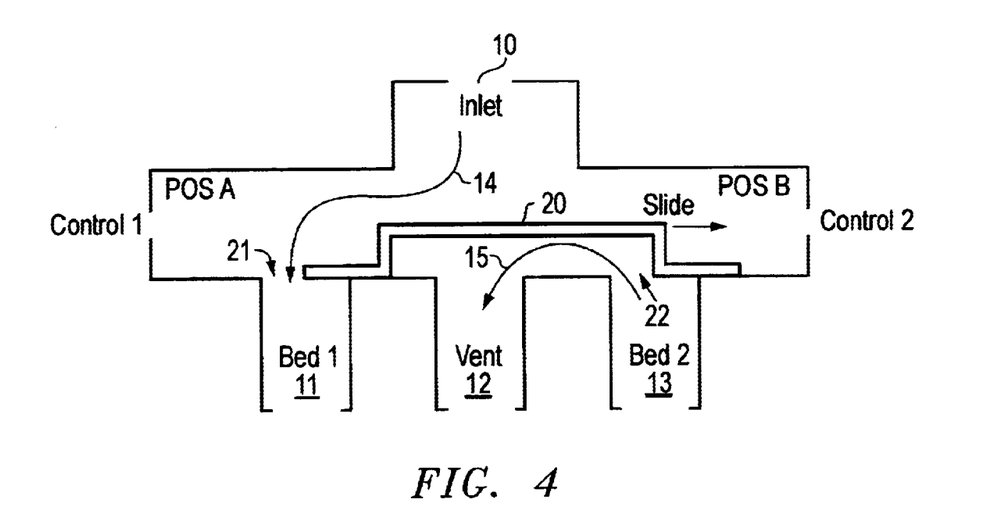
FIG. 4 is a cross section of the 4-port slide valve of the present invention, depicting state 3 where the valve has moved partially from state 1 to state 2. The state 3 is for bed 1, causing variable amounts of restrictions of flow to bed 1 and venting from bed 2 to the vent port.

State 3 is created when the slide valve in its movement from POS A to POS B is stopped creating a variable amount of restriction 21 in the flow of gas between the input 10 and the selected outlet 11. Simultaneously with restriction 21 between ports 10 and 11, the transitioning provides a restriction 22 between ports 13 and 12, as depicted in FIG. 3. State 3 is also created when the slide valve, V1 during its normal movement from POS B to POS A is stopped, creating a variable amount of restriction 19 in flow of gas between the input 10 and the selected outlet 13, as depicted in FIG. 4. Simultaneously with restriction 19 between ports 10 and 13, the transitioning provides a restriction 18 between ports 11 and 12, as depicted in FIG. 3.

State 3 can also be created during the transition from POS A to POS B if the movement is not completely stopped, but the movement is slow, where the transition period or slew is the same as the half cycle period.

An input connection 10 for each of the n sieve beds is in gas flow communication with an outlet 11, 12, and 13 of the slide valve V1. A movement system MS, such as mechanical or gas controls CONTROL1, CONTROL2, controllably moves the slide valve V1 for one state to another. A controller/monitor C/M that is operably connected to the movement means MS varies the restriction in a selected open passageway in the slide valve V1.

Figure 7:
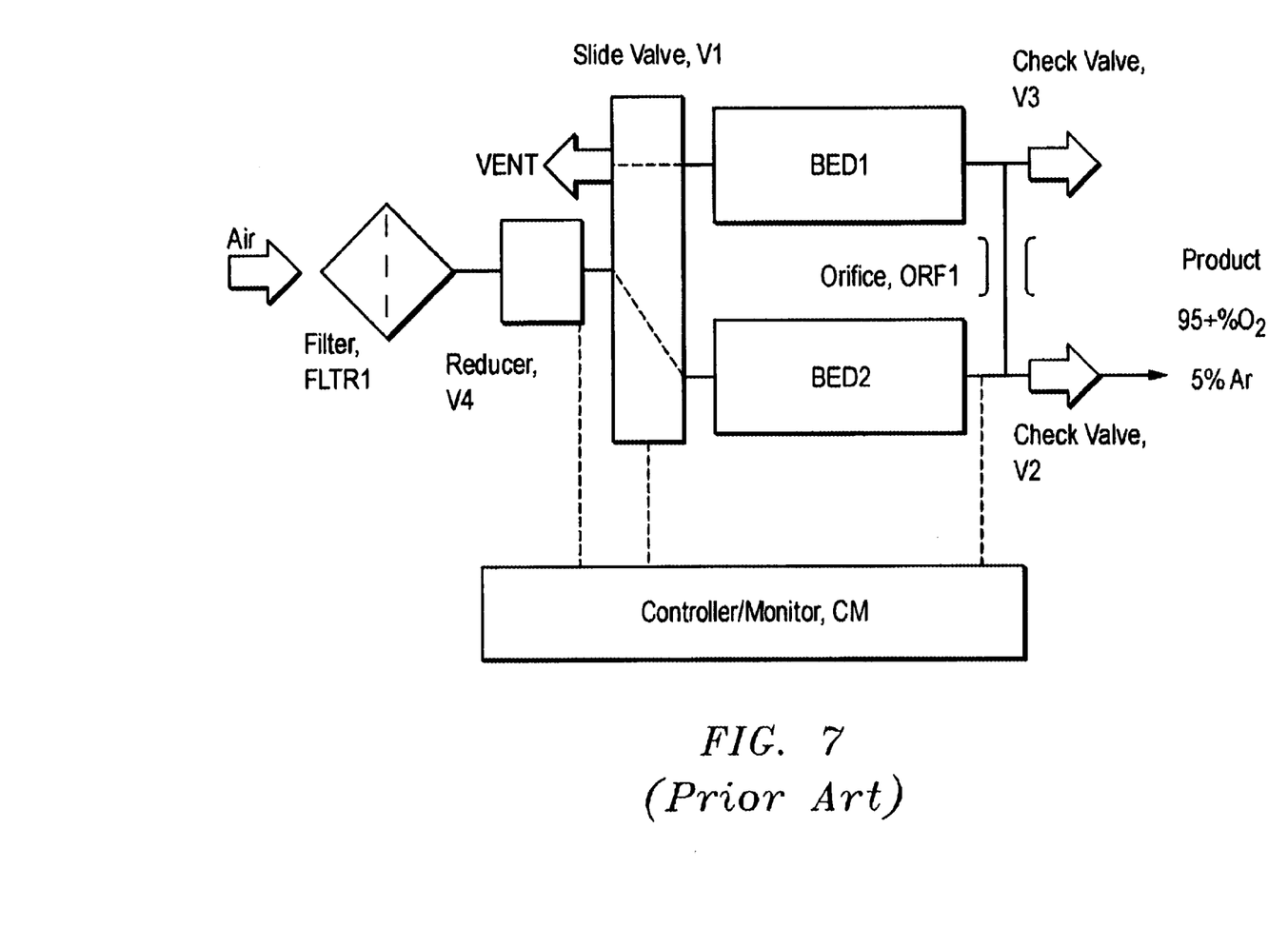
FIG. 7 is a graphical representation of a typical OBOGS with a slide valve air control.

With reference to known types of OBOGS shown in FIG. 7, a functional schematic diagram is provided that employs variable bed restriction control for regulating oxygen concentration. The OBOGS illustrated in FIG. 7 may utilize conditioned engine bleed air and electrical power from the aircraft resources to provide oxygen enriched air for crewmember breathing within a predefined range.

Additional molecular sieve beds can be added in "parallel" to oxygen beds, BED1 and BED2, and appropriately operationally connected into the apparatus. To simplify explanation of the present invention, however, only two are shown and will be discussed.

The two oxygen beds are cycled alternately between the pressurization or oxygen-producing mode and the vented (or flushed), regenerative, nitrogen-purging mode by the slide valve V1. The oxygen-enriched output product gas from the pressurized beds flows through check valves CV1 and CV2 and on to the crewmember breathing gas delivery lines or other desired product gas outputs. An oxygen sensor in the controller/monitor, CM provides a continuous monitoring of the outlet gas quality and other pre-determined characteristics. The controller/monitor, CM may optionally provide a warning signal to detect off-limit or out-of-limit conditions.

The combination shutoff valve/regulator REG1 is located at the input to the concentrator, just after the filter FLTR1, so that the concentrator may be shut down by a command from the controller/monitor CM or deactivated when electrical power is removed. The shutoff valve utilizes inlet air pressure supplied from the CM to control the shutoff valve. The shutoff valve is spring loaded in the closed position and opens only when energized, allowing the control pressure to overcome the spring pressure. The shutoff valve protects the molecular sieve beds in the event air pressure is available and the CM does not have electrical power.

The pressure regulator is used to maintain molecular sieve bed pressure, and therefore pressure swing, at a constant value so that unit performance is not affected by upstream variations in air pressure, and to avoid excessive air use when the inlet pressure is high.

The regulator produces a controlled gauge pressure.

Pressure swing cycling of the molecular sieve beds in the prior art system is accomplished through the use of reciprocating slide valve V1. The valve is activated by a control system of either gas or mechanical means, Control1 and Control2. An electronic timing circuit in the CM causes the control system to change state. The cycle rate is selected and fixed to best accommodate flight conditions.

Check valves CV1 and CV2 are built into the output flow tube of the oxygen beds and direct the output of the producing bed to the connector outlet and limit the backflow that purges the molecular sieve of the non-producing bed. Check valves and purge orifices can be replaced by additional control valves. To simplify expansion of the present invention, only the current invention will be discussed with non-controlled devices.

Purge flow for the oxygen beds is accomplished through dual precision-machined orifices ORF1 and ORF2 contained in a cross-flow tube connecting the bed caps upstream of the check valves. The dual orifice approach could be replaced with a single orifice in cross flow tube, ORF1.

The concentrator preferably includes a CM that monitors and controls the concentrator. The CM may provide the operator with continuous verification of acceptable concentrator performance and detection of concentrator failures, as well as verification of the CM functionality.

In the normal monitoring mode, the oxygen product gas flows to the CM and is monitored for purity above acceptable limits. The CM may provide a warning via a discrete warning signal whenever the partial pressure of oxygen drops below a specified limit as a function to altitude.

The controller monitor CM controls the function of the cycling of the slide valve V1.

Composition control (which is active for altitudes less than a predetermined altitude) may be selected by placing a switch in an identified position or can be automatic. This in turn, provides a control signal to the CM that activates the restriction cycle control mechanism. In this mode, the oxygen concentration is controlled within the pre-determined limits. This control is accomplished by varying the operation of the slide valve V1. The slide valve responds to signals from the CM, which continuously compares the product gas oxygen concentration to an ideal level, and varies the slide valve operation, and specifically the restriction in the fluid/air flow, accordingly to maintain the required concentration.

It is preferred that both the frequency (or period) of the bed cycles and the relative duration of the vent or fill to overall cycle time remain constant or unchanged using this method of varying product gas composition. Unlike prior known OBOGS, the present method provides a manner of generating a desired oxygen concentration by monitoring the oxygen concentration of the product gas and adjusting the amount of restriction created by the valve assembly such that the resulting oxygen concentration is driven toward the desired value.

Figure 2:
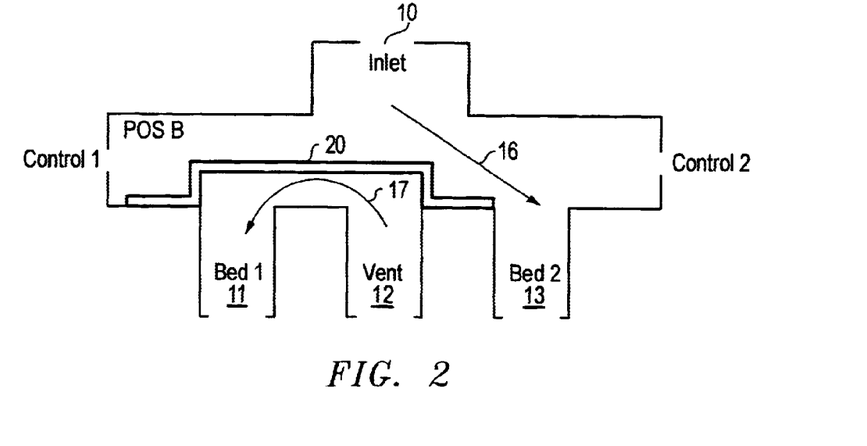
FIG. 2 is a cross section of the 4-port slide valve of the present invention, depicting state 1 for bed 2 is fully open to the inlet (closed to the vent) and state 2 for bed 1 is fully open to the vent (closed to the inlet).

FIGS. 1 & 2 schematically illustrate two positions of a slide valve V1 with (labeled position A and position B). When the Sliding Block 20 is in position A, inlet gas flows without restriction from the inlet 10 to Port 11 through path 14. Simultaneously, vent gas flows without restriction from Port 13 to Port 12 through path 15. Similarly, gas will flow from the inlet 10 to Port 13 through path 16 when the sliding block 20 is in position B and simultaneously, vent gas flows without restriction from Port 11 to Port 12 through path 17.

If the sliding block 20 is stopped at any point between position A and position B, creating state 3, FIGS. 3 & 4, there will be some restriction created in the flow path. By controlling CONTROL1 and CONTROL2 operably connected to opposing sides of the sliding block 20 that jointly act to drive the sliding block component 20 of the sliding valve V1 back and forth, it is possible to provide variable amounts of flow restriction as a function of time.

In operation, controlling the slide block 20, by air pistons or gears or motors or electromagnets causes the sliding valve block 20 to rapidly move from position A to position B. Then at a predetermined, fixed time, the slide bock will move from position B to position A.

A solenoid valve can be operably connected to each piston to pressurize and vent the piston, thereby actuating the piston, and one of the solenoid valves can be cycled at a more rapid rate during venting portions of a venting/pressurization cycle.

Figure 5:
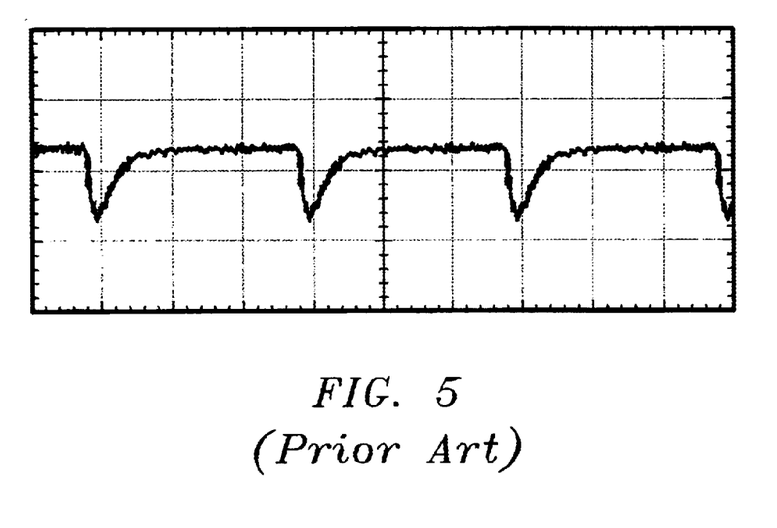
FIG. 5 is a graphical illustration showing how gas pressure at the sieve bed inlet varies with normal slide valve transit time (or valve system operation) typical of prior art devices.

The trace depicted in FIG. 5 of inlet pressure (depicting flow) was recorded from an OBOGS slide valve. The first shows a normal unit without modification to the slide valve transit time.

Figure 6:
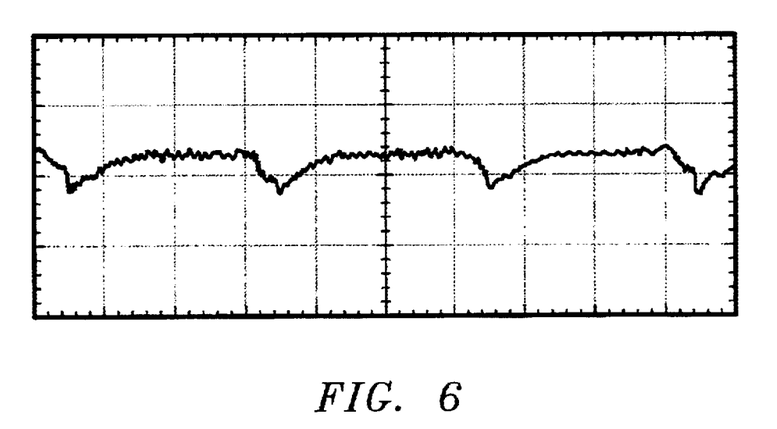
FIG. 6 is a graphical illustration similar to FIG. 5 showing how gas pressure in the sieve bed inlet varies with restricted flow due to controlled valve operation.

The traces depicted in FIG. 6 shows the same inlet pressure with the CM modulating the control mechanism to provide slower slide valve transit time. Note the significantly reduced pressure dips. This results in lower oxygen concentration.

While the valve V1 is described as a slide type of valve above, any type of valve assembly may be utilized such that it is controllable and can function to provide a variable restriction on the fluid flow. For example a rotary valve having an outer ring and an interior element whereby the outer ring is movable about the inner element (or vice versa) may be substituted. The inlet and the outlets would be formed in the outer ring and inner element such that a rotary movement opens and closes passageways formed in the inner element and outer ring.

The foregoing disclosure and description of the invention are illustrative and explanatory thereof, and various changes in the size, shape and materials, as well as in the details of the illustrated construction may be made without departing from the spirit of the invention.

What is claimed is:

1. A molecular sieve gas concentration controller system for controlling a molecular sieve device separating a selected gas from an input gas supply, the apparatus comprising:

n gas concentrating molecular sieve beds;
a valve assembly having at least n different states, where n is at least 2; the valve further having:
an input for receiving the input gas supply and at least n outlets;
in each state of the valve assembly, the valve creates an open passageway permitting for flow of gas from the input of the valve to at least one different outlet; and from a second outlet to a vent;
the valve having a first position having an open passageway from the input to a selected outlet, and a second position having a blockage between the input to the selected outlet; and,
transitioning the valve from the first to the second position creates a variable amount of restriction in the flow of gas between the input and the selected outlet; and from second outlet to the exhaust;
an input connection for each of the n sieve beds in gas flow communication with an outlet of the valve;
movement means for controllably moving the valve assembly for one state to another; and,
control means operably connected to the movement means for varying the restriction in a selected open passageway in the valve assembly;
whereby a mass flow restriction is created between the inlet or outlet and the sieve beds reducing performance of the molecular sieve beds below optimum levels.

2. The apparatus of claim 1 further including a sensor means operably connected to the controller for sensing a concentration of a desired constituent of the product gas.

3. The apparatus of claim 1 wherein the valve assembly is a slide valve and the movement means are two opposing pistons operably connected to opposing sides of a sliding block component of the slide valve.

4. The apparatus of claim 3 further including a solenoid valve operably connected to each piston to pressurize and vent the piston thereby actuating the piston.

5. The apparatus of claim 4 wherein one of the solenoid valves is cycled at a more rapid rate during venting portions of a venting/pressurization cycle.

6. A method for controlling a molecular sieve device separating a selected gas from an input gas supply to reduce performance of molecular sieve beds below optimum levels, comprising the steps of:

providing n gas concentrating molecular sieve beds;
providing a valve assembly having at least n different states of a slide block member, where n is at least 2; the valve assembly further having:
  an input for receiving the input gas supply and at least n outlets; each of the n sieve beds having an input connection in gas flow communication with an outlet of the valve assembly;
  in each state of the valve assembly, the valve assembly creates an open passageway permitting for flow of gas from the input of the valve to at least one different outlet;
  the valve assembly having a first position having an open passageway from the input to a selected outlet, and a second position having a blockage between the input to the selected outlet; and,
actuating movement means for controllably moving the valve assembly for one state to another to transition the slide block member of the valve assembly from the first to the second position creates a variable amount of restriction in the flow of gas between the input and the selected outlet; as well as restriction if flow of gas between second outlet and exhaust;
  whereby a pressure drop is created between the inlet or outlet and the sieve beds reducing performance of the molecular sieve beds below optimum levels.

7. The method of claim 6 further including controlling the movement of the valve assembly with a control means operably connected to the movement means for varying the restriction in a selected open passageway in the valve assembly.

8. The method of claim 6 further including a sensor means operably connected to the controller for sensing a concentration of a desired constituent of the product gas.

9. The method of claim 6 wherein the valve assembly is a slide valve type and the movement means are two opposing pistons operably connected to opposing sides of a sliding block component of the slide valve.

10. The method of claim 9 wherein the movement means further includes a solenoid valve operably connected to each piston to pressurize and vent the piston thereby actuating the piston.

* * * * *

UNITED STATES PATENT AND TRADEMARK OFFICE
CERTIFICATE OF CORRECTION

| | | |
|---|---|---|
| PATENT NO. | : 6,669,758 B1 | Page 1 of 1 |
| APPLICATION NO. | : 10/064268 | |
| DATED | : December 30, 2003 | |
| INVENTOR(S) | : Russell F. Hart, Charles B. Hager and Adrienne M. Miller | |

It is certified that error appears in the above-identified patent and that said Letters Patent is hereby corrected as shown below:

<u>Title page,</u>
Item [75], Inventors, should read as follows:
-- Russell F. Hart; Charles B. Hager; and, Adrienne M. Miller --.

Signed and Sealed this

Twenty-seventh Day of June, 2006

JON W. DUDAS
*Director of the United States Patent and Trademark Office*